United States Patent [19]
Ishimaru et al.

[11] Patent Number: 4,990,847
[45] Date of Patent: Feb. 5, 1991

[54] MICROCOMPUTER

[75] Inventors: Yoshiyuki Ishimaru; Akio Kiji, both of Itami, Japan

[73] Assignee: Mitsubishi Denki Kabushiki Kaisha, Tokyo, Japan

[21] Appl. No.: 450,639

[22] Filed: Dec. 14, 1989

[30] Foreign Application Priority Data

Dec. 19, 1988 [JP] Japan .................. 63-321568

[51] Int. Cl.[5] .................................. G05F 3/24
[52] U.S. Cl. .................. 323/314; 323/317; 323/901; 364/707
[58] Field of Search ............... 323/313, 314, 315, 316, 323/317, 901; 364/184, 187, 707

[56] References Cited

U.S. PATENT DOCUMENTS

| | | | |
|---|---|---|---|
| 4,476,428 | 10/1984 | Iwasawa et al. | 323/901 |
| 4,542,330 | 9/1985 | Terbrack | 323/901 |
| 4,713,600 | 12/1987 | Tsugaru et al. | 323/314 |
| 4,764,716 | 8/1988 | Sturzl | 323/901 |
| 4,825,142 | 4/1989 | Wang | 323/314 |
| 4,857,823 | 8/1989 | Bitting | 323/901 |

Primary Examiner—Peter S. Wong
Attorney, Agent, or Firm—Townsend and Townsend

[57] ABSTRACT

The voltage of a CPU operation power source is stepped down by a regulator to a voltage for causing oscillation of an oscillator. The output voltage of the oscillator is stepped up by a level shifter.

3 Claims, 4 Drawing Sheets (a)

(b)

(a)

(b)

(a)

(b)

MICROCOMPUTER

BACKGROUND OF THE INVENTION

1. Field of the Invention

This invention relates to microcomputers and, more particularly, to a single-chip microcomputer, in which a CPU, a CPU power source, a RAM, a ROM, a main clock oscillator circuit, a low clock frequency oscillator circuit, etc., are formed on a single chip. More specifically, the invention concerns reduction of power consumption for oscillation.

2. Description of the Prior Art

FIG. 4 shows the construction of an oscillator circuit 1 in a prior art single-chip microcomputer, in which a low clock frequency oscillator circuit at 32.768 Hz, for instance, is provided separately from a main clock oscillator circuit. Reference numerals 2 and 3 designate input and output side pads, respectively, to which an oscillating element such as a crystal oscillator is connected. Numeral 4 designates a MOS inverter, which is constituted by a enhancement N-channel MOS transistor 5 and enhancement P-channel MOS transistor 6. Its gate is connected to the pad 2, and its output terminal is connected to the pad 2, and its output terminal is connected to the pad 3. Numeral 7 designates a CMOS clocked inverter including enhancement N-channel MOS transistors 8 and 9 and enhancement P-channel MOS transistors 10 and 11. The transistors 9 and 10 have their gates connected to the pad 2 and their output terminals connected to the pad 3. A H/L signal 13 is supplied as control signal from a CPU 12 to the clocked inverter 7. The CMOS inverter 14 serves to invert the polarity of the H/L signal 11. The output side pad 3 is connected to the input terminal of a CMOS inverter, the output terminal of which is connected to the input terminal of a CMOS inverter 16.

The operation will now be described. The oscillator circuit has the CMOS inverter 4 and CMOS clocked inverter 7 connected in parallel and the input and output terminals connected to the input and output side pads 2 and 3, respectively. Denoting the gains of the inverter 4 and clocked inverter 7 by 1 and 2, respectively, when the H/L signal from the CPU 12 is "H", at which time the clocked inverter 7 is "on", the gain of the oscillating transistor that is constituted by the inverters 4 and 7 is 1+2. When the H/L signal 13 is "L", the clocked inverter is "off", and the gain of the oscillating transistor at this time is 1. Unless the gain of the oscillating transistor is large, the oscillator circuit 1, although it difficulty starts oscillation, maintains oscillator even if the gain is reduced after the oscillation is stabilized. In the oscillating transistor of the oscillator circuit 1, by setting the gain permitting start of oscillation to be $\beta_1+\beta_2$ and setting the gain permitting maintenance of oscillation to be 1, the oscillator circuit can function such that it can readily start oscillation and hold the oscillation current after the stabilization of oscillation to be comparatively low.

Now, a surge protection circuit of the prior art single-chip microcomputer using the oscillator circuit 1, will now be described together with its pattern layout. FIG. 5(a) is an equivalent circuit diagram of the oscillator circuit including the surge protection circuit, and FIG. 5(b) shows an actual pattern layout example, with parts like those in FIG. 4 designated by like reference numerals. Referring to the Figures, the input side pad 2 consists of aluminum and is connected to a resistor 17 consisting of polysilicone or silicide. The outer terminal the resistor 17 is connected to the drain of an N-channel aluminum-gate filed transistor 18. This drain is also connected to a resistor consisting of polysilicone or silicide. Reference numeral 20 designates a parasitic diode which is formed when the aluminum-gate field transistor 18. The other terminal of the resistor 19 is connected to the drain of an N-channel enhancement MOS transistor 21 of polysilicone or silicide and also to the input terminal of the oscillator circuit 1. The output terminal of the oscillator circuit 1 is connected to the output side pad 3 which consists of aluminum. The transistors 18 and 21 have their sources and gates grounded so that they are "off".

The operation will now be described. In the oscillator circuit 1, the resistor 17, transistor 18, parasitic diode 20, resistor 19 and transistor 21 constitute an input protection circuit. The resistor 17 serves to limit current in the field transistor 18 and also alleviate overcurrent in the inrush section. The field transistor 18 functions as a parasitic lateral transistor to cause current escapement, while the parasitic transistor 20 cause current escapement, with reverse breakdown of its PN junction. The transistor 21 serves to clamp voltage applied to the inner circuit with punch-through of parasitic NPN transistor. On the side of the output side pad 3 of the oscillator circuit 1, no particular protective circuit is provided because of a comparative large pattern area in case when the CMOS inverter 4 and CMOS clocked inverter 7 are connected in parallel. More specifically, reference numeral 22 in FIG. 5(b) is a wiring pattern for ground potential Vss, and 23 a wiring pattern for leading a power source voltage Vcc. Between these wiring patterns are formed the pads 2 and 3, resistor 17, transistor 18 and oscillator circuit 1 which occupies a large area.

The low frequency oscillator circuit in the prior art single-chip microcomputer as noted above is constructed such that the gain of the oscillating transistor can be varied to reduce the current consumption at the time of the stable oscillation. However, since the power source voltage of the oscillator circuit 1 consisting of the inverters 4 and 7 is the same as the CPU operation voltage, which may be 2.4 to 5.5 V, the oscillation current can be reduced only down to about 4.0 μA. Further, the surge voltage on the side 3 of the output side pad 3 that can be withstood, is reduced with reduction of the size and gain of the oscillator circuit 1.

SUMMARY OF THE INVENTION

The present invention has been intended in order to obviate the problems in the prior art, and its object is to provide a microcomputer, which permits reduction of the current consumption as oscillation current in a low frequency oscillator circuit to be 2.0 μA or less, i.e., one half or less of the prior art, without deterioration of the capacity of withstanding the surge voltages on the input and output sides in such case.

According to a first mode of the invention, there is provided a microcomputer, which comprises a regulator for stepping down a CPU operation voltage to a low voltage for causing low frequency oscillation and a level shifter for stepping up the oscillator output voltage up to the amplitude of the CPU operation voltage. According to a second mode of the invention, there is provided a microcomputer, in which the step-down regulator can provide a higher first low voltage and a lower second low voltage, and which further comprises switching means for permitting the oscillator to be driven with the higher first low voltage at the time of the start. According to a third mode of the invention, there is provided a microcomputer, in which a protective circuit like that on the input side is provided between the oscillator and output side pad.

According to the first mode of the invention, the voltage of CPU operation power source is stepped down by the regulator to a low voltage for causing oscillation of the oscillator, and the output voltage thereof is stepped up by the level shifter.

According to the second mode of the invention, at the time of the start of the oscillator the switching means is operated to cause the step-down regulator to provide the higher first low voltage for driving the oscillator.

According to the third mode of the invention, the output pad protective circuit permits sufficient protection against surge even where the oscillator is small in size.

The above and other objects, features and advantages of the present invention will be more apparent from the following description taken in conjunction with the accompanying drawings.

DESCRIPTION OF THE PREFERRED EMBODIMENT

Figure 1:
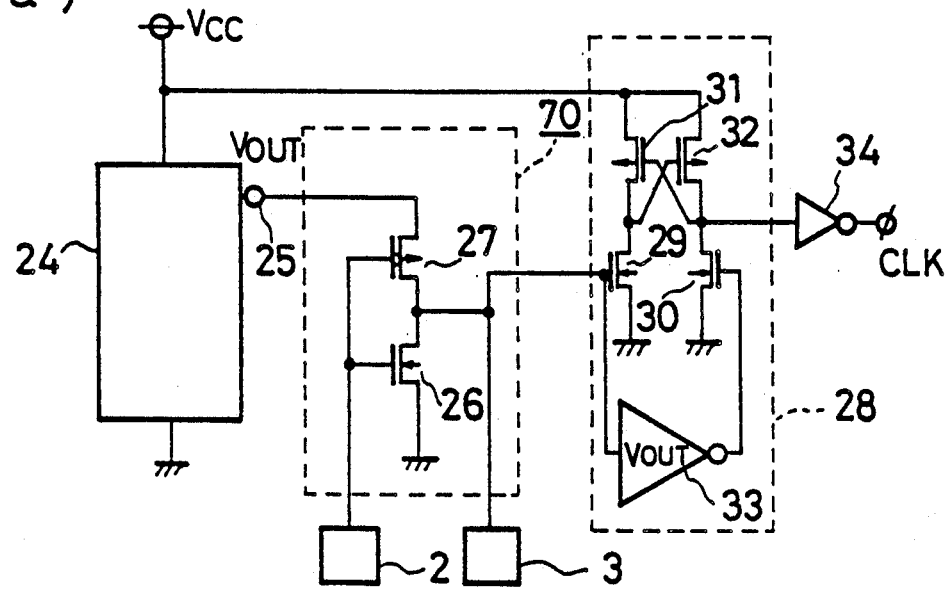
FIG. 1(a) is a schematic showing an embodiment of the invention applied to a low frequency oscillator circuit of a single-chip microcomputer.
FIG. 1(b) is a circuit diagram showing a step-down regulator as a component of the oscillator circuit.
Figure 1:
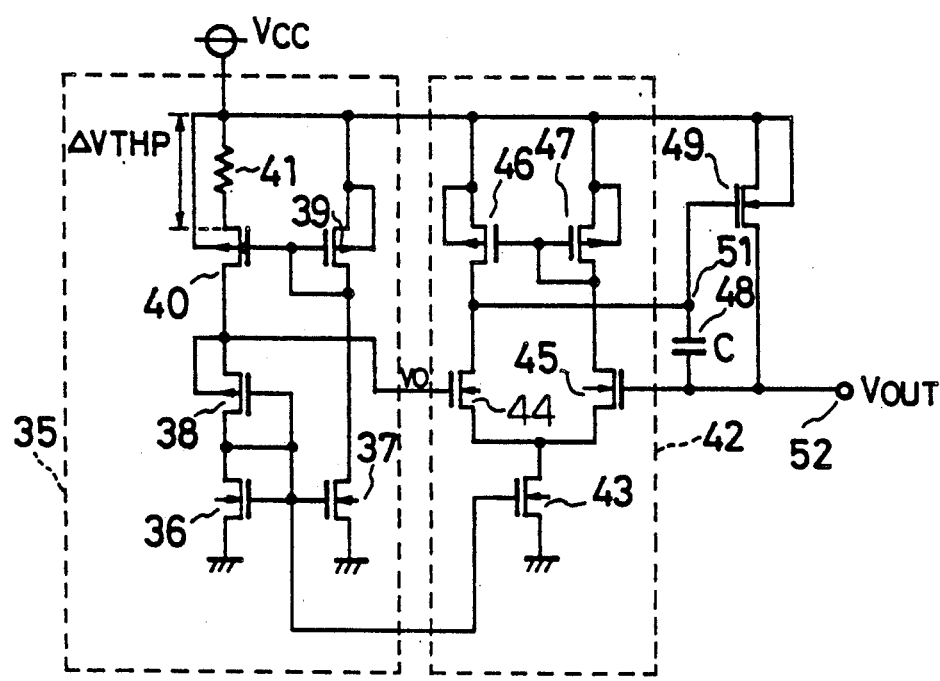

Now, an embodiment of the invention will be described with reference to the drawings. FIG. 1(a) shows a low frequency oscillator circuit as an embodiment of the invention. In the Figure, reference numeral 24 designates a step-down regulator. A specific example of the step-down regulator is shown in FIG. 1(b). The step-down regulator 24 converts a CPU operation voltage Vcc, for instance of 2.4 V, to a low voltage Vout, for instance of 1.5 V. The low voltage is provided from a terminal 25 to a low frequency oscillator 70 capable of being operated by low voltage. The oscillator 70 is a CMOS inverter constituted by an enhancement N-channel MOS transistor 26 and an enhancement P-channel MOS transistor 27 with a lower input threshold value than that of any different P-channel transistor. Input and output side pads 2 and 3 are connected to the input and output sides of the inverter. The output side is connected to a level shifter 28. The level shifter 28 includes enhancement N-channel MOS transistors 29 and 30, enhancement P-channel MOS transistors 31 and 32 and a CMOS inverter 33 operable by the low voltage Vout. The transistors 29 and 30 have their sources connected to ground, and the transistors 31 and 32 have their sources supplied with the CPU operation voltage Vcc. The drain of the transistor 29 is connected to the drain of the transistor 31 and the gate of the transistor 32. The gate of the transistor 29 is connected to the output side of the oscillator 70. The drain of the transistor 30 is connected to the drain of the transistor 32 and gate of the transistor 30. The gate of the transistor 31 is supplied with a signal from the inverter 33 which inverts the output of the oscillator 70. The drain output of the transistor 30 is supplied as output of the level shifter 28 to the CMOS inverter 34, and the output of the inverter 34 is supplied as clock voltage CLK to the CPU.

Now, the operaration will be described. The oscillator 70, with the pads 2 and 3 connected to the oscillating element, is driven for oscillation by the output voltage Vout of the step-down regulator 24. Since the oscillation output amplitude is a low voltage Vout lower than the voltage Vcc, it is stepped up by the level shifter 28 to Vcc, and a clock voltage CLK is generated through the inverter 34 as output buffer.

Now, the step-down regulator 24 will be described with referernce to FIG. 1(b). Referring to the Figure, reference numeral 35 is a constant-voltage generator including enhancement N-channel MOS transistors 36 and 37, enhancement P-channel MOS transistors 38 and 39, an enhancement P-channel MOS transistors 40 with a lower input threshold value than that of the transistors 38 and 39 and a resistor 41. Numeral 42 designates an operational amplifier including enhancement N-channel MOS transistors 43, 44, 45, and enhancement P-channel MOS transistors 46 and 47. Numeral 48 designates an operational amplifier phase compensation capacitor, and 49 an enhancement P-channel MOS transistor for supplying voltage. The output Vo of the constant-voltage generator 35 is supplied to the gate of the transistor 44, and the output from the output terminal 51 of the operational amplifier 42 is supplied to the gate of the transistor 49. The transistor 49 has its source held at the voltage Vcc and its drain held at the low voltage Vout and also connected to the gate of the transistor 45 providing the other input to the operational amplifier 42. The operational amplifier 42 functions as a comparator to compare the outputs Vo and Vout.

The operation will now be described. The input threshold voltage of the N-channel MOS transistors 36, 37 and 43 to 45 and 49 is denoted by VTHN, that of the ordinary P-channel MOS transistors 38, 39, 46 and 47 by VTHP1, and that of the transistor 40 by VTHP2, with VTHP1>VTHP2. The resistance of the resistor 41 is denoted by R ($\Omega$). In the constant-voltage generator 35, the transistors 39 and 40 are held at common gate potential, but their input threshold voltages are different. Thus, a potential difference of $\Delta VTHP = VTHP1 - VTHP2$ (V) is generated across the resistor 41. Thus, in the constant-voltage generator 35 a constant current $\Delta VTHP/R$ (A) flowing through the transistors 36, 38, 40 and 41 is produced to produce a constant voltage output Vo, which is $Vo \approx VTHN + VTHP1$ (V). This output voltage Vo is provided as the input of the operational amplifier 42 and applied to the transistor 49 to produce the output voltage Vout at the outpu 1 terminal 52. As a result of comparison of the output voltages Vo and VOUT, constant voltage VOUT, subject to less variations, is produced, which is given as VOUT VTHN+VTHP1 (V). VTHN, VTHP1 and VTHP2 are set such that the output voltage VOUT usually 1.5 V or below when the power source voltage Vcc is 2.4 V.

In order that the oscillator 70 shown in FIG. 1 (a) functions even with a low voltage of 1.5 or below, the input threshold voltage VTHP2 of the CMOS inverter P-channel side transistor 27 is set to be low as in the case of the transistor 40 shown in FIG. 1 (b). Since the voltage supplied to the oscillator 70 is as now as 1.5 V or below and also the transistor gain can be reduced, the oscillation current can be extremely reduced. It is thus possible to reduce the current consumed by the entire oscillator circuit to be one half or below of the current in the case of the prior art.

By using the low frequency oscillator 70 in the above embodiment, it is possible to realize a single-chip microcomputer, which consumes low current in a mode, in which the sole oscillator is used. As an example, in case where the power source is backed up by a timepiece count battery, long time back-up can be obtained without use of an expensive high performance battery.

In the above embodiment shown in FIGS. 1 (a) and 1 (b), however, the voltage supplied to the oscillator 70 is as low as 1.5 V or below at all time. Therefore, it is liable that the oscillation start is difficult depending on the characteristics of the oscillating element.

Figure 2:
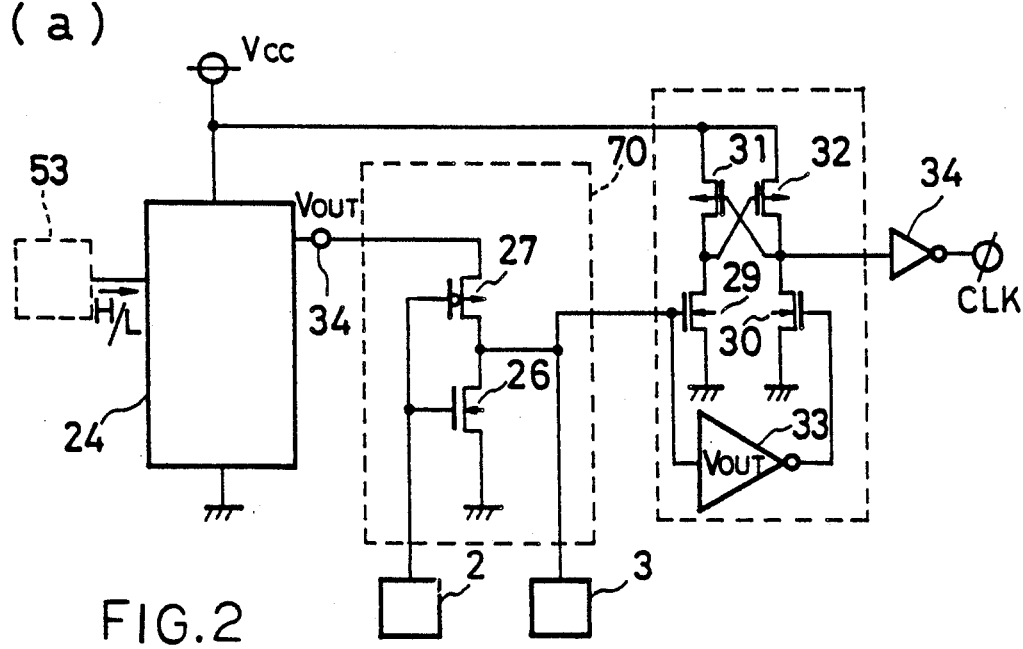
FIG. 2(a) is a schematic showing a modification of the low frequency oscillator circuit of the single chip microcomputer shown in FIG. 1(a)
FIG. 2(b) is a circuit diagram showing a step-down regulator as a component of the same modification.
Figure 2:
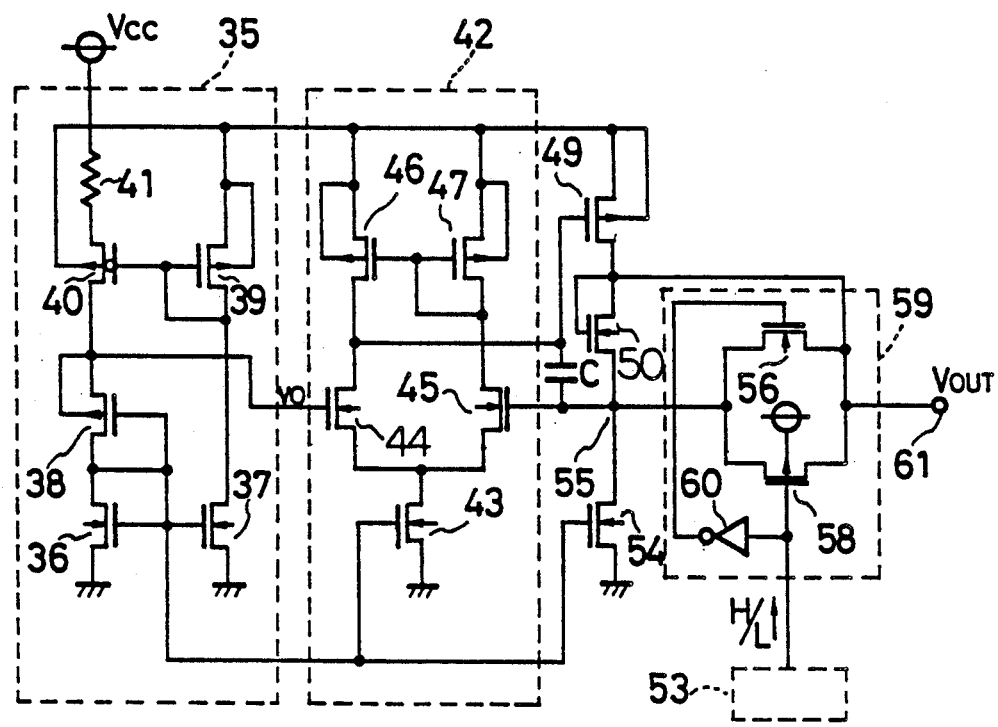

FIGS. 2 (a) and 2 (b) show a different embodiment, which is contemplated to solve the problem noted above. In this instance, the step-up regulator output voltage is switched, according to a control signal from switching means 53 of the CPU, between two voltages, i.e., a lower second low voltage of 1.5 V or below and a higher first low voltage, which is slightly higher than the second low voltage, and with which the oscillation can be readily started.

By using the above embodiment of the low frequency oscillator 70 it is possible to realize a single-chip microcomputer, which consumes less current in a mode, in which the sole oscillator is used. For example, it is possible to obtain long-time back-up of power source by time counter battery without use of an expensive and high performance battery.

However, in the embodiment shown in FIGS. 1(a) and 1(b), the voltage supplied to the oscillator 70 is as low as 1.5 V or below at all time, and the oscillation is sometimes difficulty started depending on the characteristics of the oscillating element.

FIGS. 2(a) and 2(b) is designed to solve the above problem. In this instance, the output voltage of the step-down regulator is switched between a second low voltage of 1.5 V or below and a first low voltage slightly higher than the second low voltage, i.e., a voltage permitting ready start of oscillation, according to a control signal from the switching means 53 of the CPU.

Now, the embodiment of the invention shown in FIGS. 2(a) and 2(b) will be described. FIG. 2(a) is a view showing the structure of a low frequency oscillator. Unlike the case shown in FIG. 1(a), a voltage switching signal H/L is supplied from switching means 53 in the CPU to the step-down regulator 24. FIG. 2(b) shows a specific circuit construction of the step-down regulator 24. In the Figure, parts like those in FIG. 1(b) are designated by like reference numerals. Reference numerals 50 and 54 designate enhancement N-channel MOS transistors. The transistor 50 is connected between the drain of a voltage supply transistor 49 and the gate 55 of the transistor 45 as a comparator input, and its drain is connected to the drain of the transistor 49. The transistor 54 has its source grounded and its gate connected to the drain of the transistor 36 in the constant-voltage generator 35 as in the case of the transistors 36, 37 and 43. The transistor 54 provides a constant voltage VTHN as its output, and it thus functions as a constant-current generation transistor. Enhancement N-and P-channel transistors 56 and 58 have their sources and drains connected together to form a transmission gate 59. To the gate of the P-channel transistor is supplied the signal H/L from the switching means 53 of the CPU, and the output of a CMOS inverter 60 inverting the H/L signal is supplied to the side of the N-channel transistor.

Now, the voltage switching operation of the step-down regulator will be described.

Referring to FIG. 2(b), a low voltage of VTHN+VTHP1 (V) is generated at the connection point 55, which is the same as in the case of FIG. 1(b). The transistors 49, 50 and 54 carry a constant current, and a voltage VTHN+VTHP1 + VTHN (V), which is higher than the potential at the connection point 55 by the input threshold voltage VTHN of the transistor 50 is generated at the drain of the transistor 49. When the signal H/L is "H", the transmission gate 59 is "off", and a first constant voltage of VOUT≈2VTHN+VTHP1 is generated at the output terminal 61. When the signal H/L is "L", the transmission gate 59 is "on", so that a voltage on the connection point 55, i.e., the second low voltage of VOUT≈VTHN+VTHP1, is generated at the output terminal 61. At this time, the transistor 50 is "off" with the drain, source and gate at the same potential. In other words, it is possible to select one of two, i.e., high and low, output voltages according to the switching signal H/L from the switching means 53 of the CPU.

Thus, at the time of the start of oscillation the signal H/L may be set to "H" to supply the higher voltage, i.e., first low voltage, to the oscillator shown in FIG. 2(a) so as to permit ready start of the oscillation, while setting after the stabilization of the oscillation the signal H/L to "L" to switch the voltage supplied to the oscillator to a second low voltage of 1.5 V or below so as to reduce the oscillation current.

As has been shown, with the structure shown in FIGS. 2(a) and 2(b) according to the invention it is possible to realize a low frequency oscillator consuming less current. In addition, the oscillation can be readily started without being influenced by the characteristics of the oscillating element.

Now, a surge protection circuit on the side of the pads 2 and 3 at the input and output terminals of the oscillator 70 applied to the single-chip microcomputer will be described.

Figure 5:
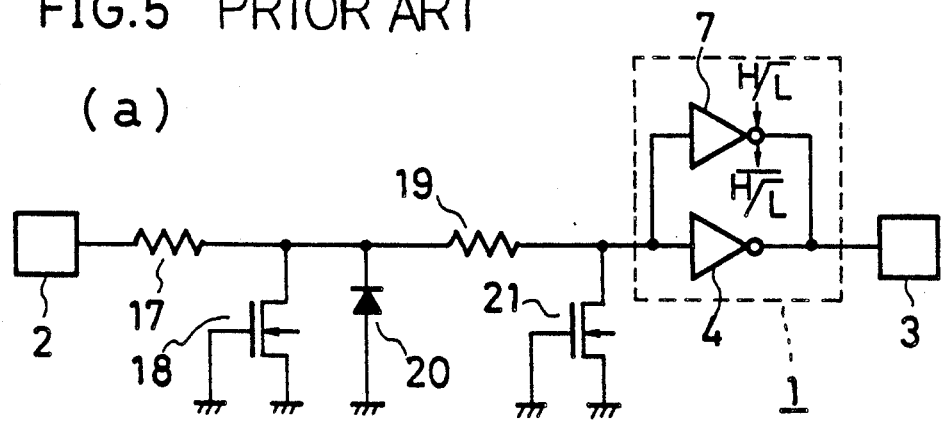
FIG. 5(a) and 5(b) are views similar to FIGS. 3(a) and 3(b) but being an equivalent circuit diagram and a pattern layout diagram of a prior art input protective circuit, respectively.
Figure 5:
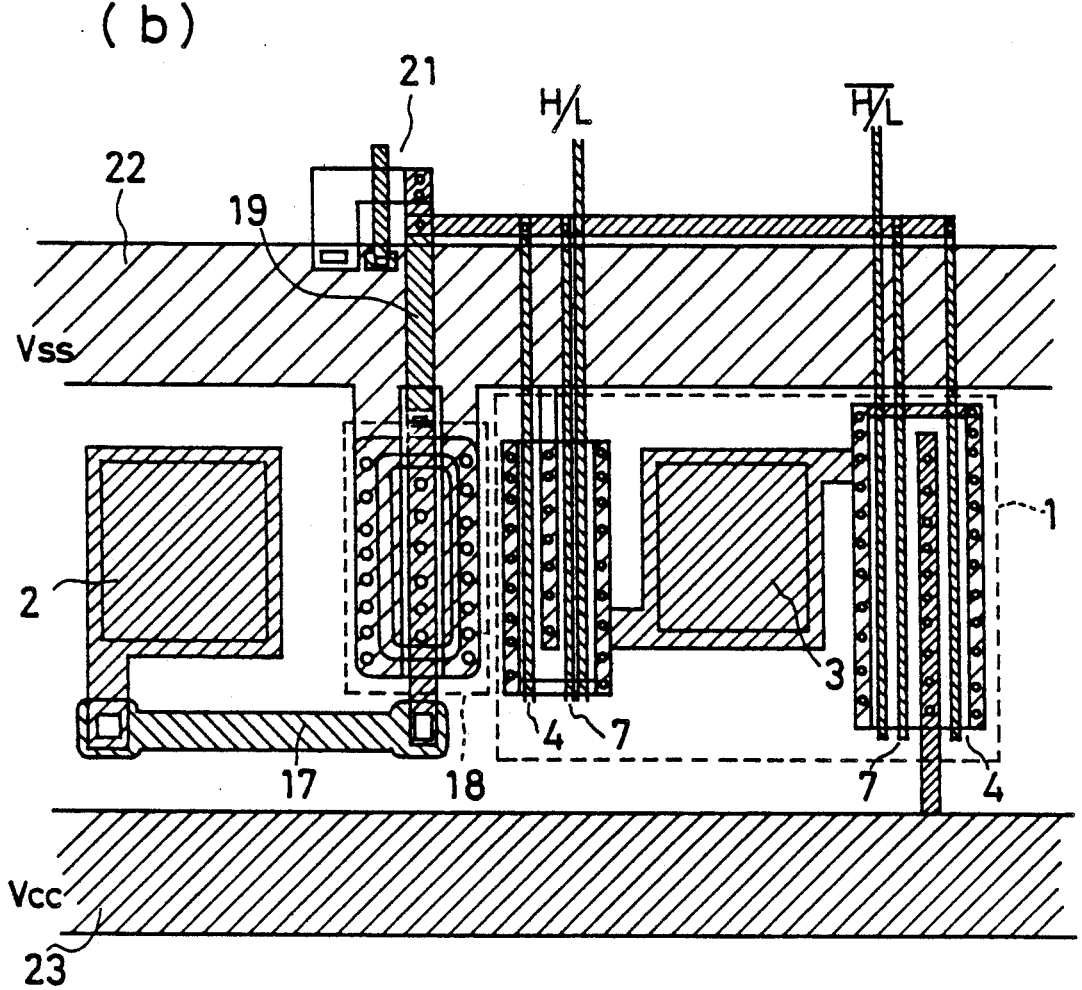

In the prior art surge protection circuit described before with reference to FIG. 5, although the oscillator circuit according to the invention can be direclty used, with respect to the output side some surge protection means is necessary for the oscillator 70 is extremely small in size. However, if a circuit with a high added capacitance such as a large-size "off" transistor is provided as protective circuit to the output side, it is possible that the oscillation current in the oscillator 70 is increased with charging and discharging currents due to the added capacitance. Therefore, it is necessary to provide a surge protection circuit with as low added capacitance as possible.

Accordingly, the invention features the provision on the side of the output side pad of a surge protection circuit comparable to that on the input side as surge protection circuit of the oscillator.

Figure 3:
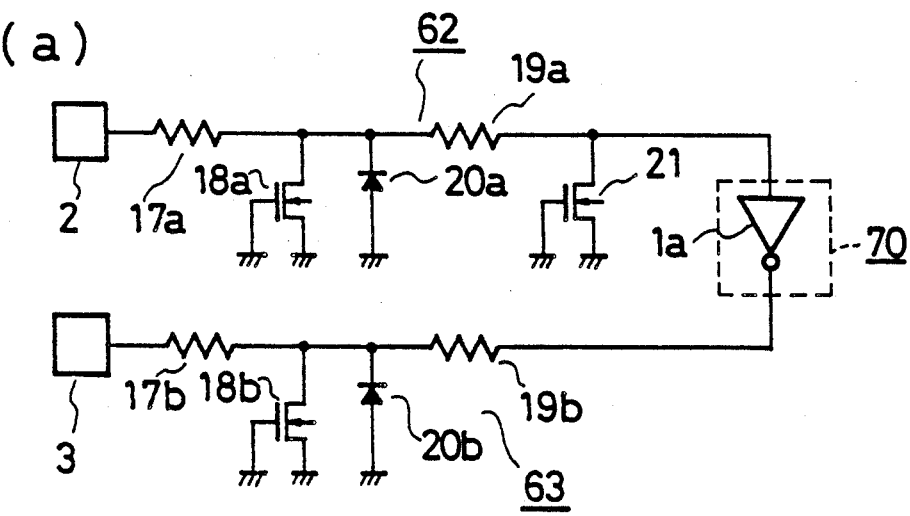
FIG. 3(a) and 3(b) illustrate an example of an input protective circuit according to the invention applied to a single-chip microcomputer, with FIG. 3(a) being an equivalent circuit diagram and FIG. 3(b) being a view showing a pattern layout.
Figure 3:
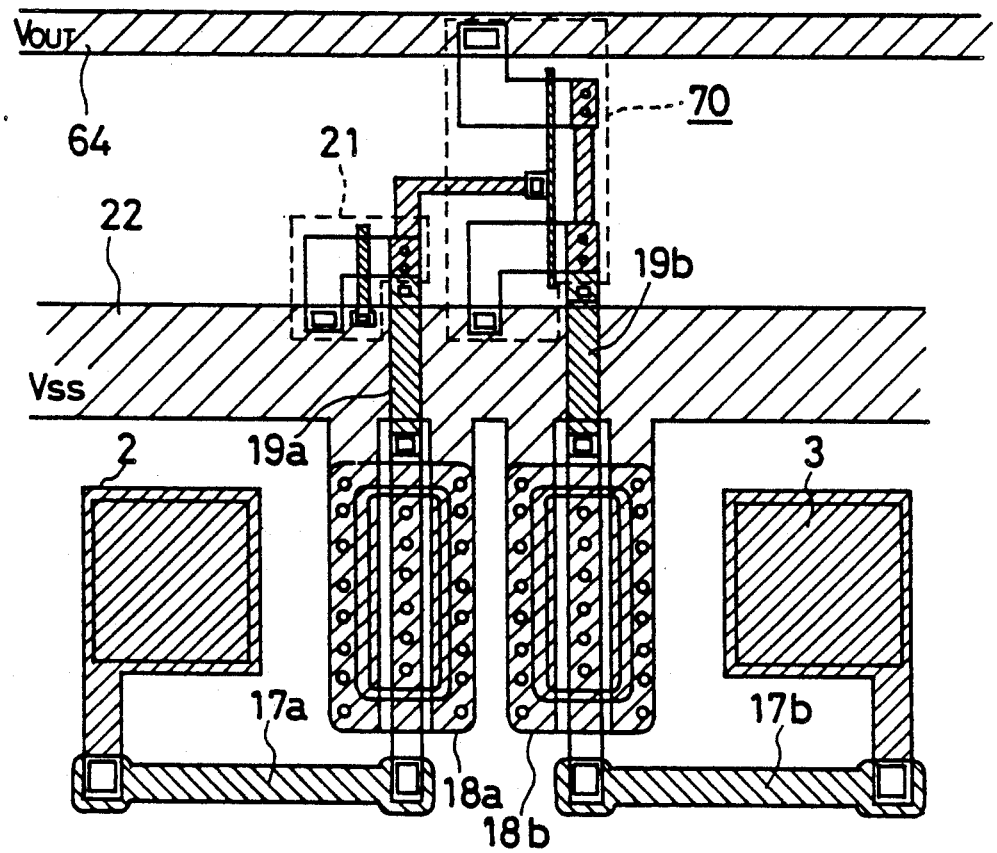
Figure 4:
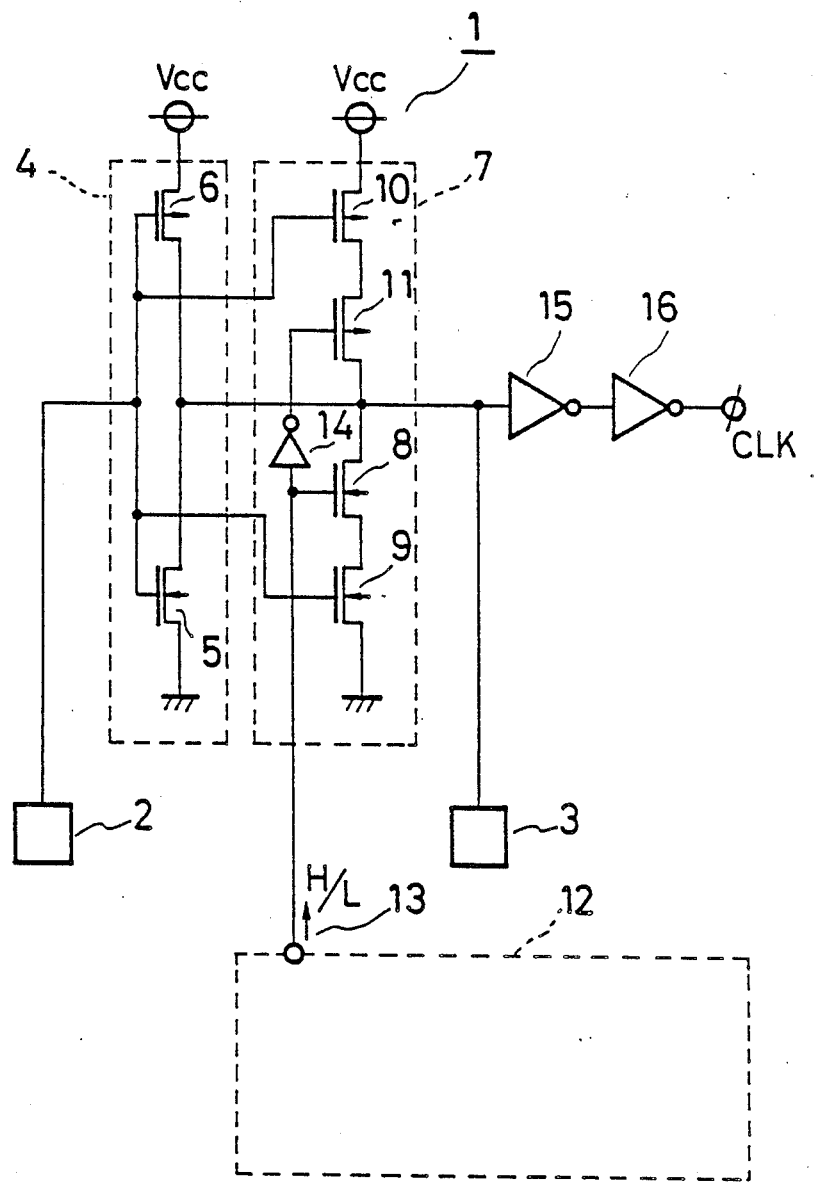
FIG. 4 is a schematic showing a low frequency oscillator circuit of a prior art single-chip microcomputer.

FIGS. 3(a) and 3(b) show a specific example of the input side surge protection circuit. FIG. 3(a) shows an equivalent circuit, and FIG. 3(b) shows a pattern layout.

In this instance, the protection circuit for the input side of the oscillator 70 constituted by the CMOS inverter, i.e., the input protection circuit as first protective circuit 62 on the side of the input side pad 2, is entirely the same as that shown in FIGS. 5(a) and 5(b), so that its detailed description is omitted.

The output side of the oscillator 70 consists of a polysilicone or siliside resistor 19b connected to the drain of a CMOS inverter 1a as an element of the oscillator 1, an N-channel field MOS transistor 18b with the drain connected to the other end of the resistor 19b and the source and gate connected to ground, a polysilicone or silicide resistor 17b connected to the drain of the transistor 18b and an output side pad 3 connected via aluminum to the other end of the resistor 17b. A diode 20b is a parasitic diode which is formed when forming the field transistor 18b. The output side protective circuit constitutes a second protective circuit 63 and is the same as the first protective circuit 62. The output side transistor 21 is unnecessary because its role is served by the CMOS inverter 1a.

With this construction, an oscillator which is strong with respect to electrostatic breakdown can be formed independently of the size of the transistor constituting the oscillator 70. Further, it is possible to reduce the output side load capacitance because only the N-channel field transistor is used. Further, as shown in FIG. 3(b), the pattern area of the oscillator 70 can be small compared to the pattern area of the prior art oscillator shown in FIG. 5(b). Therefore, the provision of the second protective circuit will not increase the total occupied area. Reference numeral 64 designates a wiring pattern for leading the low voltage VOUT.

In the above description of the oscillator circuit according to the invention, the step-down regulator is only an example, and it can be replaced with any other circuit, which consumes low current and has an equivalent function. Further, while the oscillator 70 is constituted by a CMOS inverter, it is possible to use any other circuit having a function of stopping oscillation, i.e., a CMOS NAND. Further, the oscillation output may be obtained not from the side of the output side pad 3 but from the input side pad 2. Further, such an improvement as adding a Schmitt circuit to the oscillator output is possible for eliminating noise. Further, the level shift circuit is only an example in the circuit construction itself, and it can be replaced with any other circuit having the same function. Further, the illustrated pattern layout of the input side protective circuit of the oscillator 70 is only an example, and various pattern layouts which are the same in the equivalent circuit are conceivable.

As has been described in the foregoing, according to the first mode of the invention there are provided a step-down regulator for stepping down the voltage of a CPU operation power source to a low voltage, a oscillator including an oscillating element and input and output pads connected thereto and capable of oscillation according to a low voltage output of said step-down regulator and a level shifter for stepping up the output voltage of the oscillator up to the voltage of the CPU operation power source. Thus, it is possible to reduce current consumption. Further, according to the second mode of the invention, there is provided, in addition to the first mode of the invention, switching means for controlling the step-down regulator at the time of the start of the oscillator such as to provide a higher first low voltage first and then provide a lower second low voltage. Thus, it is possible to ensure reliable start of oscillation.

Further, according to the third mode of the invention, there is provided, in addition to the first mode of the invention, a protective circuit including an overvoltage alleviation resistor, a field transistor and a time-constant setting resistor, these components being connected in the mentioned order in the direction of the oscillator from the input side pad. Thus, it is possible to ensure reliable protection of the output side pad from surges.

What is claimed is:

1. A microcomputer comprising a step-down regulator for stepping down the voltage of a CPU operation power source to a low voltage, an oscillator including an oscillating element and input and output side pads connected thereto and capable of oscillation according to a low voltage output of said step-down regulator and a level shifter for stepping up the output voltage of said oscillator up to said voltage of said CPU operation power source.

2. A microcomputer comprising a step-down regulator for stepping down the voltage of a CPU operation power source to a higher first low voltage and a lower second low voltage, an oscillator including an oscillating element and input and output side pads connected thereto and capable of oscillation according to a low voltage output of said stepdown regulator, switching means for controlling said stepdown regulator at the time of the start of said oscillator such as to provide said higher first low voltage first and then provide said lower second low voltage and a level shifter for stepping up the output voltage of said oscillator up to said voltage of said CPU operation power source.

3. A microcomputer comprising a step-down regulator for stepping down the voltage of a CPU operation power source to a low voltage, an oscillator including an oscillating element and input and output side pads connected thereto and capable of oscillation according to a low voltage output of said step-down regulator, a level shifter for stepping up the output voltage of said oscillator up to said voltage of said CPU operation power source, a first protective circuit including an overvoltage allevation resistor, a field transistor and a time-constant setting resistor, these components being connected in the mentioned order in the direction of said oscillator from said input side pad, and a second protective circuit including an overvoltage allevation circuit, a field transistor and a time-constant setting resistor, these components being connected in the mentioned order in the direction of said oscillator from said output side pad.

* * * * *